United States Patent [19]

Heideman et al.

[11] Patent Number: 5,159,997

[45] Date of Patent: Nov. 3, 1992

[54] MINIATURE SHOCK ABSORBER

[75] Inventors: Robert J. Heideman, Westland; Richard T. Mitera, Canton, both of Mich.

[73] Assignee: Enertrols, Inc., Westland, Mich.

[21] Appl. No.: 606,443

[22] Filed: Oct. 31, 1990

[51] Int. Cl.⁵ .............................................. F16F 9/50
[52] U.S. Cl. .................... 188/282; 188/285; 188/315; 188/322.15
[58] Field of Search ............... 188/281, 282, 315, 285, 188/287, 322.14, 322.15, 322.22, 299; 267/130

[56] References Cited

U.S. PATENT DOCUMENTS

| | | | |
|---|---|---|---|
| 3,371,751 | 3/1968 | Dickenson | 188/315 |
| 4,122,923 | 10/1978 | Ellis et al. | 188/285 |
| 4,131,266 | 12/1978 | Carter | 267/34 |
| 4,139,182 | 2/1979 | Nagase et al. | 188/285 |
| 4,164,274 | 8/1979 | Schupner | 188/285 |
| 4,174,098 | 11/1979 | Baker et al. | 267/130 |
| 4,344,637 | 9/1982 | Williams, Jr. et al. | 188/317 X |
| 4,433,759 | 2/1984 | Ichinose | 188/282 |

OTHER PUBLICATIONS

ACE Controls Inc., data sheet, "Adjust-A-Shock".

Primary Examiner—Robert J. Oberleitner
Assistant Examiner—Lee W. Young
Attorney, Agent, or Firm—Krass & Young

[57] ABSTRACT

A miniature shock absorber including an outer tubular housing, an inner tubular housing positioned within the outer tubular housing to define a pressure chamber within the inner housing and an annular accumulator chamber between the housings, a piston mounted for movement in the inner tubular housing, and a piston rod extending out of the front end of the tubular housings for impact by an object to be decelerated. A needle valve is positioned in the rear end of the shock absorber for coaction with an axial passage defined at the rear end of the pressure chamber. The needle valve is threadably received in the rear end wall of the shock absorber and includes an external knob to threadably move the needle valve relative to the axial passage to thereby vary the resistance offered to an impacting object. Return flow of fluid from the accumulator chamber to the pressure chamber occurs through a radial metering port in the inner tubular housing coating with an annular axial passage defined between the piston and a reduced diameter valving portion of the piston rod with the piston shuttling back and forth relative to the piston rod to selectively preclude and allow communication between the pressure chamber and the accumulator chamber. Also disclosed is a stop arrangement, including a stop collar formed as an integral front end portion of the outer tubular housing, to preclude bottoming of the piston against the end wall and to provide precise predetermined end limit positioning for the impacting object.

18 Claims, 4 Drawing Sheets

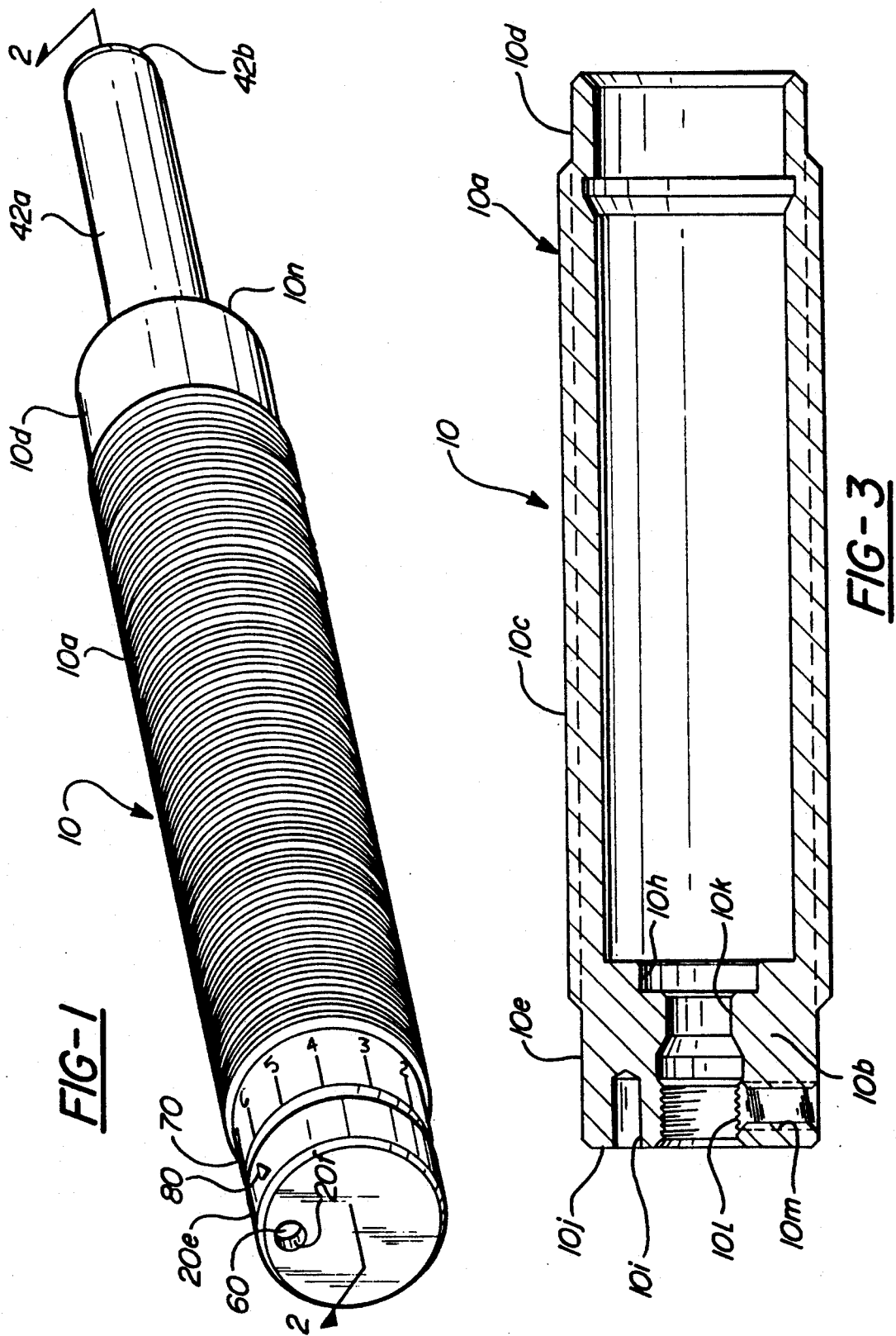

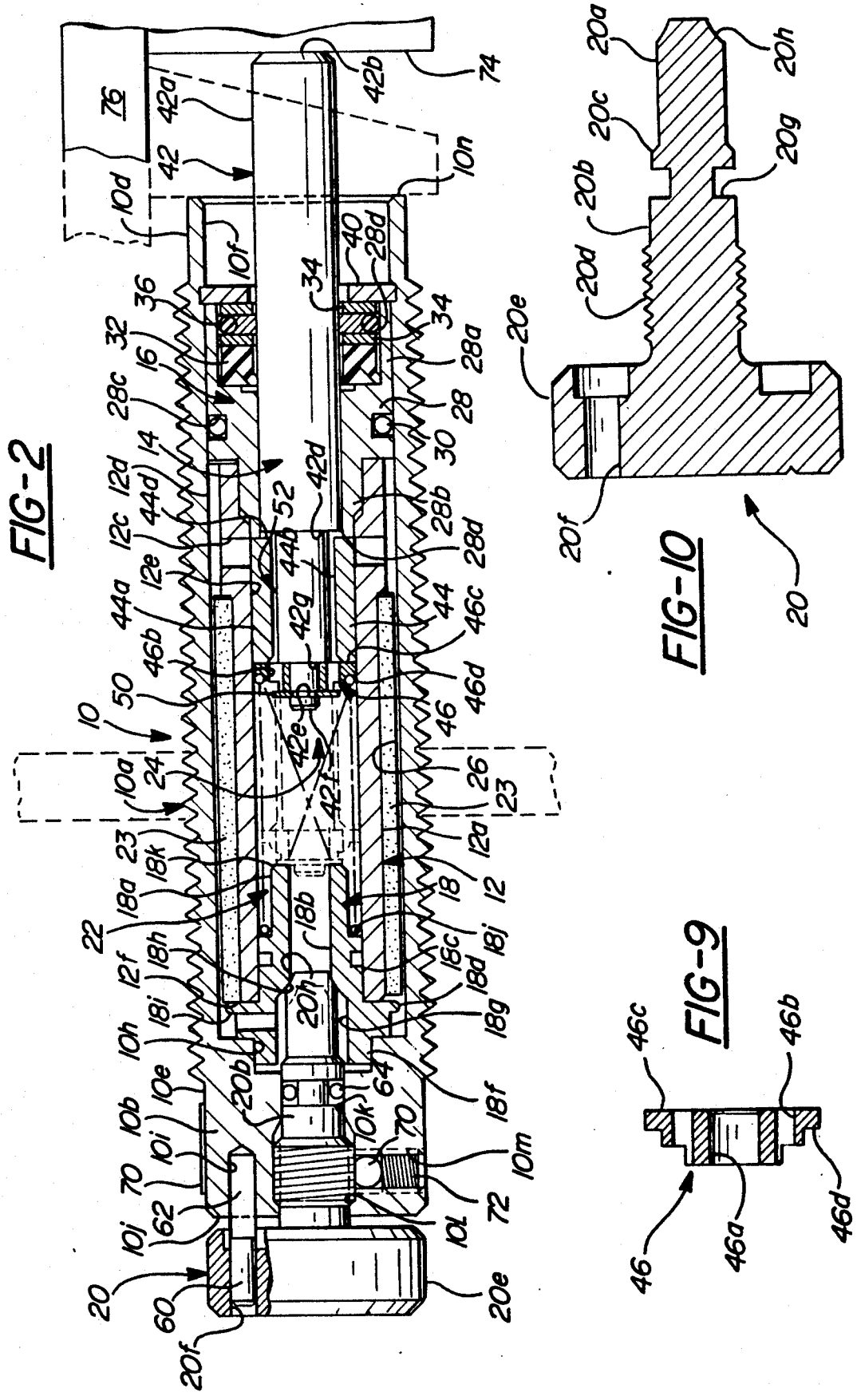

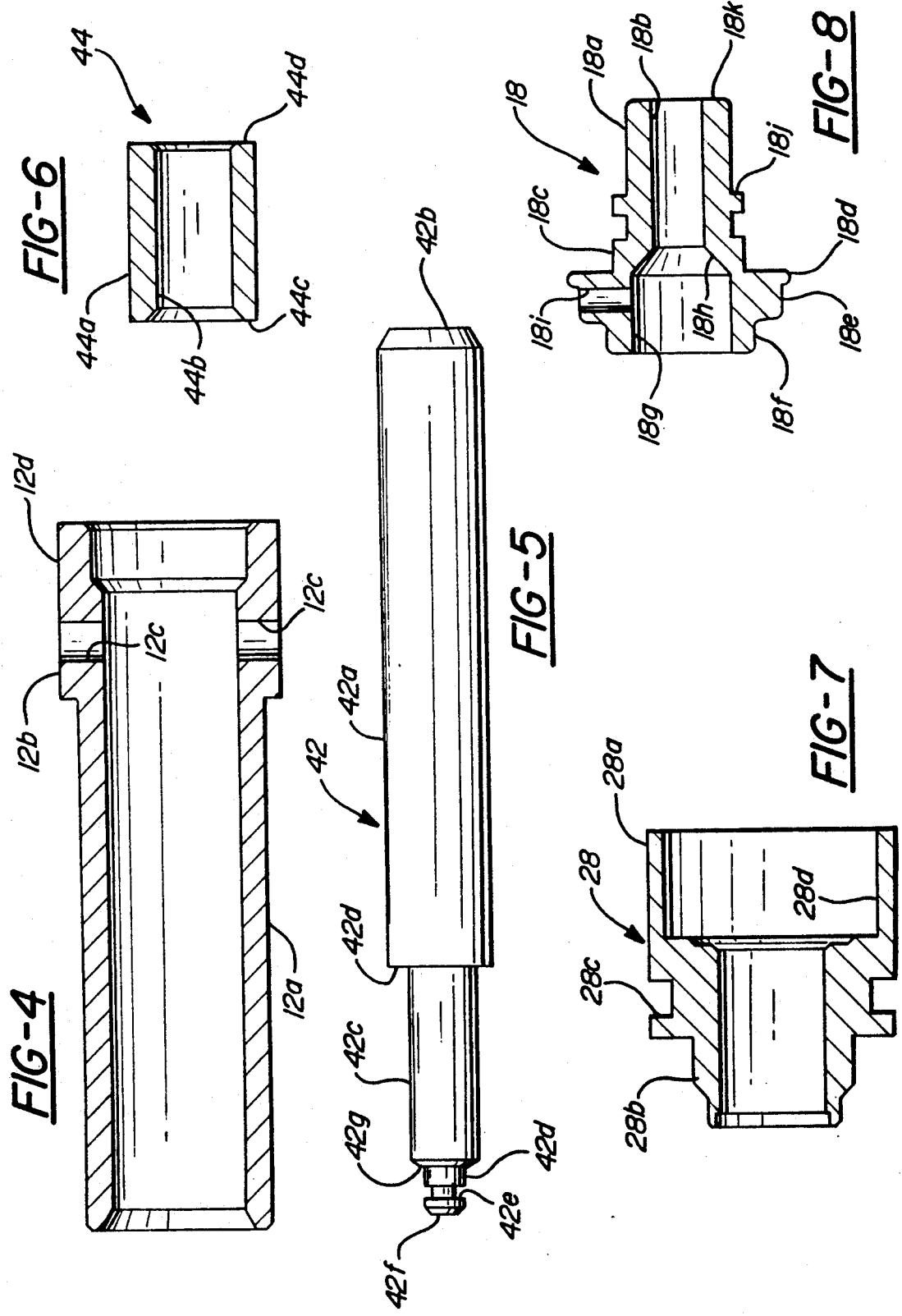

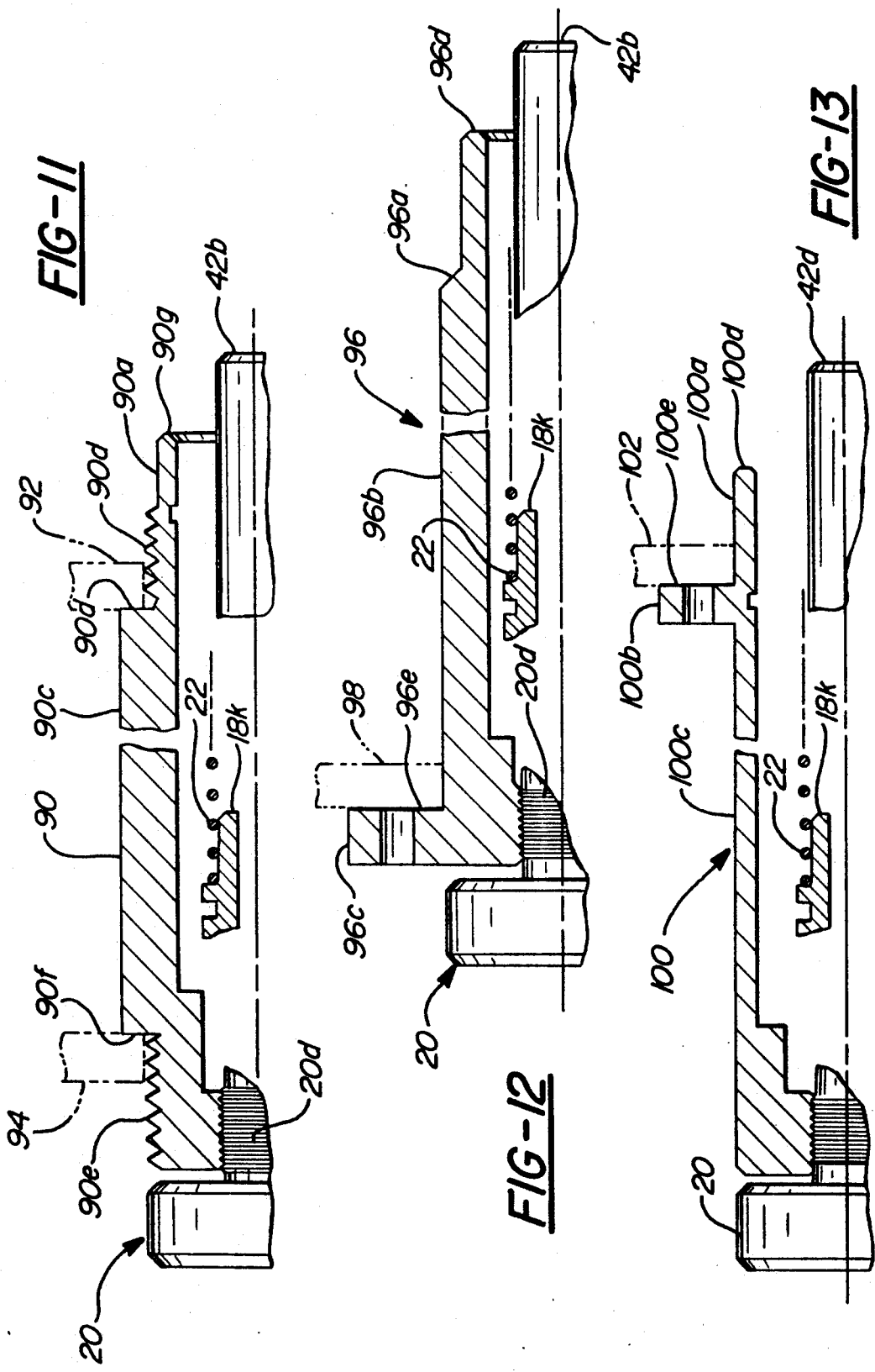

MINIATURE SHOCK ABSORBER

BACKGROUND OF THE INVENTION

This invention relates generally to a shock absorber device for decelerating a machine part by imposing a force on the part over the stroke of the shock absorber device and more particularly to such a shock absorber device of miniaturized construction.

Shock absorbers which force fluid through a restricted orifice to convert the kinetic energy of a moving part into an increase in the thermal energy of the fluid are commonly used on machines. In a typical installation, a machine tool or transfer arm moves back and forth repetitively between separate operating positions and the movement of the tool or arm as it arrives at each position is cushioned and decelerated by a shock absorber positioned on the tool or arm or on the adjacent support structure. Ideally, as the tool or arm is decelerated at each end of its reciprocal movement, the shock absorber acts to exert a relatively constant resistive force against the tool and smoothly decelerates the tool to a stop position in which the piston of the shock absorber has traversed substantially the entire length of the cylinder of the shock absorber so as to take advantage of substantially the entire cushioning capacity of the shock absorber, and the piston comes to a stop just shy of the end of the cylinder so as to avoid bottoming of the piston against the end of the cylinder.

Whereas various metering constructions have been proposed to convert the kinetic energy of the moving part into an increase in the thermal energy of the fluid, none of the prior art metering constructions have provided totally satisfactory operation in shock absorbers of compact or miniaturized construction.

Further, none of the prior art shock absorber constructions have provided simple and totally effective means to ensure that the piston does not bottom against the end of the cylinder and to provide a positive positioning of the machine tool or transfer arm so as to positively and precisely position the workpiece carried by the machine tool or transfer arm to facilitate the performance of a work operation on the workpiece.

SUMMARY OF THE INVENTION

This invention is directed to the provision of a metering and valving arrangement which may be readily and effectively incorporated into a shock absorber of miniaturized construction.

This invention is further directed to the provision of an improved stop arrangement for a shock absorber to prevent bottoming of the piston of the shock absorber against the rear end wall of the shock absorber in response to an object impacting against the piston rod of the shock absorber and provide a precise predetermined work positioning for the impacting object.

The shock absorber of the invention is of the type including an outer tubular housing having a front end and a rear end and defining a central axis; an inner tubular housing having a front end and a rear end, positioned within the outer tubular housing, and defining a pressure chamber within the inner housing and an annular accumulator chamber between the inner and outer housings; port means establishing fluid communication between the chambers; a piston assembly including a piston mounted for reciprocal sliding movement in the inner tubular housing and a piston rod connected to the piston and extending out of the front ends of the tubular housings for impact by an object to be decelerated; and valving means establishing fluid communication between the pressure chamber and the accumulator chamber at a relatively rearward location in the shock absorber. According to the invention, the shock absorber includes means operative to preclude movement of fluid through the port means from the pressure chamber to the accumulator chamber and the valving means includes means defining an axially extending passage proximate the rearward end of the pressure chamber and a valve member positioned in the passage to define an annular orifice with the passage means, adjustably movable along an axis parallel to the central axis of the shock absorber, and operative in response to such movement to vary the size of the metering orifice and thereby vary the resistance to movement of fluid through the valving means. This simple metering or throttling arrangement provides an effective and readily adjustable means for determining the resistance to the fluid movement between the pressure chamber and the accumulator chamber and yet is simple enough to allow ready assembly in miniaturized form without complicated machinery and without skilled labor.

According to a further feature of the invention, the shock absorber further includes an adjuster member positioned exteriorly of the outer tubular housing and operative when moved to adjustably move the valve member and thereby adjust the resistance provided by the valving means. This arrangement provides a ready and effective means of varying the resistance provided by the shock absorber.

According to a further feature of the invention, the axially extending passage extends rearwardly from the rear end of the pressure chamber coaxial with the axis of the shock absorber; the valve member comprises a needle valve coaxial with the shock absorber axis and extending forwardly from the rear end of the outer tubular housing; and the adjuster member is connected to the rear end of the needle valve. This arrangement provides a ready and effective means of adjusting the resistance provided by the valving structure.

According to a further feature of the invention, the shock absorber includes a rear end wall rigid with the outer tubular member, and the needle valve member and adjuster member comprise a single integral member mounted for threaded movement in the rear end wall. This arrangement allows the adjuster member to be rotated to move the needle valve threadably and axially with respect to the passage to readily vary the resistance provided by the valving structure.

According to a further feature of the invention, the adjuster member comprises a knob having an outer diameter approximating the outer diameter of the outer tubular housing. This arrangement provides a ready means of threadably turning the needle valve by a knob contained within the overall profile of the shock absorber.

According to a further feature of the invention, the piston rod defines a valving portion proximate its rear end extending between front and rear annular shoulders; the piston is annular, is positioned on the piston rod valving portion to define an annular axial passage therebetween, and has an axial length less than the axial length of the valving portion so as to be slidable axially relative to the valving portion; the inner tubular housing includes port means extending radially therethrough; and sliding movement of the piston on the piston rod valving portion between the shoulders is operative to selectively effect communication between the annular axial passage and the port means. This arrangement provides a ready and efficient means of allowing return fluid flow from the accumulator chamber to the pressure chamber during the extending or forward movement of the piston assembly while precluding fluid flow from the pressure chamber to the accumulator chamber.

According to a further feature of the invention, the front annular shoulder on the piston rod engages the front annular edge of the piston during inward stroking movement of the piston assembly to preclude communication between the annular axial passage and the port means, and the rear annular shoulder on the piston rod engages the rear annular edge of the piston during extending movement of the piston assembly to allow communication between the annular axial passage and the port means so as to allow fluid to flow from the accumulator chamber through the piston assembly to the pressure chamber during extending movement of the piston assembly.

According to a further feature of the invention, the shock absorber is of the type including an elongated outer tubular housing having an open front end; means closing the rear end of the housing and defining a rear end wall; a piston assembly including a piston slidably mounted in a bore defined within the outer tubular housing for axial movement, through a predetermined axial distance, from an extended rest position to a compressed working position proximate but spaced from the rear end wall and a piston rod secured to the piston and extending out of the open front end of the tubular housing; and means biasing the piston to its extended rest position, and the shock absorber is characterized in that the outer tubular housing includes a collar portion at the open front end thereof integral with the remainder of the tubular housing and defining an annular front edge exposed to an object impacting the front end of the piston rod, and the distance from the annular front edge of the collar portion of the tubular housing to the front end of the piston rod with the piston positioned in its extended rest position by the biasing means is generally equal to the predetermined distance between the rest and working positions of the piston. With this arrangement, a machine tool or transfer arm impacting the front end of the piston rod will reach the front annular edge of the collar portion of the outer tubular housing just as the piston reaches its compressed working position proximate the rear end wall to prevent bottoming of the piston against the rear end wall and positively and precisely position the workpiece carried by the machine tool or transfer arm to facilitate the performance of a work operation on the workpiece.

BRIEF DESCRIPTION OF THE DRAWINGS

FIG. 1 is a perspective view of a shock absorber according to the invention;

FIG. 2 is a cross-sectional view taken on line 2—2 of FIG. 1;

FIG. 3 is a cross-sectional view of an outer tubular housing employed in the invention shock absorber;

FIG. 4 is a cross-sectional view of an inner tubular housing employed in the invention shock absorber;

FIG. 5 is a view of a piston rod employed in the invention shock absorber;

FIG. 6 is a cross-sectional view of a piston employed in the invention shock absorber;

FIG. 7 is a cross-sectional view of a front bearing member employed in the invention shock absorber;

FIG. 8 is a cross-sectional view of an inner tube retainer employed in the invention shock absorber;

FIG. 9 is a cross-sectional view of a piston retainer employed in the invention shock absorber;

FIG. 10 is a cross-sectional view of an adjustable valving member employed in the invention shock absorber;

FIG. 11 is a fragmentary cross-sectional view of a shock absorber according to the invention employing a modified outer tubular housing construction;

FIG. 12 is a fragmentary cross-sectional view of a shock absorber according to the invention employing a further modified outer, tubular housing construction; and FIG. 13 is a fragmentary cross-sectional view of a shock absorber according to the invention employing a still further modified outer tubular housing construction.

DETAILED DESCRIPTION OF THE PREFERRED EMBODIMENT

The invention shock absorber, broadly considered, includes an outer tubular housing or casing 10, an inner tubular housing or pressure tube 12, a piston assembly 14, a bearing assembly 16, an adaptor 18, an adjustable valving member 20, a return spring 22, and an accumulator pad 23.

Outer tubular housing 10 includes a main body tubular portion 10a and a rear end wall portion 10b at the rear end of the housing.

Main body tubular portion 10a includes a threaded portion 10c and a front end, smooth cylindrical collar portion 10d. A further smooth, cylindrical collar portion 10e is provided at the rear of the outer tubular housing in surrounding relation to end wall 10b.

Inner tubular housing 12 includes a main body portion 12a, an enlarged diameter portion 12b, ports or passages 12c extending radially through enlarged diameter portion 12b, and a front mounting portion 12d. The outer diameter of inner tubular housing 12 is less than the inner diameter of outer tubular housing 10 so that, with inner tubular housing 12 positioned concentrically within outer tubular housing 10, the inner tubular housing defines a pressure chamber 24 within the inner tubular housing and an annular accumulator chamber 26 is defined between the inner and outer tubular housings.

Front bearing assembly 16 includes a front bearing member 28, an o-ring 30, a lip seal 32, a pair of seal retainers 34, a further o-ring 36, and a dirt excluder ring 38.

Bearing member 28 includes a main body portion 28a sized to fit within the bore 10f of the outer tubular housing 10 proximate the front end of the outer tubular housing, a rear reduced diameter mounting portion 28b sized to be telescopically received within the mounting portion 12d of inner tubular housing 12, an annular groove 28c receiving o-ring 30, and a front cavity 28d defined within the front portion of main body portion 28a and sequentially receiving lip seal 32, a seal retainer 34, ring 38 surrounded by o-ring 36, and a further seal retainer 34. A snap ring 40 received in a suitable groove in the inner periphery of outer tubular housing 10 precludes axially forward movement of the front bearing assembly within outer tubular housing bore 10f.

Piston assembly 14 includes a piston rod 42, a piston 44, and a piston retainer 46.

Piston rod 42 includes a main body portion 42a defining a front end 42b, a reduced diameter valving portion 42c proximate the rear end of the piston rod and adjoining main body portion 42a via an annular shoulder 42d, and a further reduced diameter portion 42d, at the extreme rear end of the piston rod, defining an annular groove 42e for receipt of a snap ring 50 and further defining a rear end 42f of the piston rod.

Piston 44 is annular and has an outer diameter 44a sized to fit slidably within the inner diameter or bore 12e of inner tubular housing 12 and an inner diameter 44b greater than the outer diameter of piston rod reduced diameter valving portion 42c so as to define an annular axial passageway 52 therebetween. Piston 44 has an axial length somewhat less than the axial length of piston rod reduced diameter valving portion 42c.

Piston retainer 46 has a central bore 46a sized to be fitted over piston rod reduced diameter portion 42d and is positioned between snap ring 50 and the annular shoulder 42g defined between piston rod reduced diameter portions 42c and 42d. A plurality of circumferentially spaced apertures 46b extend axially through piston retainer 46 for communication with axial annular passageway 52 between piston 44 and piston rod reduced diameter portion 42c. It will be see that, with piston retainer 46 in place over piston rod reduced diameter portion 42d, piston 44 is free to move axially slidably relative to piston rod reduced valving diameter portion 42c between annular piston rod shoulder 42d and the annular shoulder 46c defined by the front annular face of piston retainer 46.

Adaptor 18 includes a front tubular portion 18a defining a central axial passage 18b; a mounting portion 18c sized to be received with a press fit telescopically within the rear end of inner tubular housing 12 with the rear annular edge 12f of the inner tubular housing abutted against an annular flange portion 18d of the retainer; a rim portion 18e rearwardly of flange portion 18d; and a mounting hub portion 18f rearwardly of rim portion 18e sized to be press fit into a central counterbore 10h in the rear end wall 10b of outer tubular housing 10. A central axial passage 18g passes forwardly through hub portion 18f, rim portion 18e, and flange portion 18c and connects to passage 18b via a conical valve seat 18h, and a radial port or passage 18i extends radially through rim portion 18e to provide fluid communication between passage 18g and accumulator chamber 26.

Return spring 22 comprises a coil spring with its rearward end positioned over the front portion 18a of adaptor 18, for seating against an annular shoulder 18j defined at the juncture of adaptor portions 18a and 18c, and with its forward end seated against the rear annular face 46d of piston retainer 46 so as to normally urge the piston assembly forwardly to a position in which the front annular face 46c of the piston retainer is pressed against the rear annular edge 44c of the piston and the front annular edge 44d of the piston is pressed against the rear annular edge 28d of the mounting portion 28b of front bearing member 28 to define the fully extended position of the piston assembly.

Adjustable valving member 20 includes a front needle valve portion 20a, a sealing portion 20b joined to needle valve portion 20a via a conical shoulder 20c, a threaded portion 20d rearwardly of sealing portion 20b, and a knob portion 20e joined to the rear end of threaded portion 20d and having a outer diameter approximating the outer diameter of outer tubular housing 10.

A pin 60 received in an axial bore 20f in knob portion 20e projects forwardly from the front face of the knob portion for interfering coaction with a rearwardly projecting pin 62 positioned in a bore 10i opening in the rear face 10j of outer tubular housing end wall 10b to limit the relative rotational movement of knob portion 20.

Sealing portion 20b of adjustable valving member 20 is sealingly and slidably received in a bore 10k in end wall 10b with an O-ring 64 received in a groove 20g sealingly coacting with bore 10k, and threaded portion 20d is threadably received in a threaded bore portion 10l opening in the rear face 10j of end wall 10b so that turning movement of knob 20e results in axial forward or rearward movement of adjustable valving member 20 so as to advance or retract the conical forward surface 20h of needle valve portion 20a relative to valve seat 18h and thereby vary the size of the annular orifice defined between the needle valve conical portion 20h and the conical seat 18g and thereby vary the resistance offered by the needle valve to fluid flow therepast.

A soft nylon ball 70 is positioned in a radial bore 10m in end wall 10b by a set screw 72 and presses against threaded portion 20d of adjustable valving member 20 to lock the valving member in any adjusted position.

Accumulator pad 23 comprises a split annular member and is formed of a cellular plastic filled with nitrogen to give it a high degree of resilience and collapsibility. Accumulator pad 23 is positioned in accumulator chamber 26 and collapses and expands in known manner during the stroking action of the shock absorber to compensate for the variations in the volume of the pressure chamber occurring during the stroking movement of the piston assembly.

In the rest or fully extended position of the invention shock absorber, piston 44 is biased by spring 22 to the solid line position of FIG. 2 in which communication between axial passage 52 and port 12c is blocked by the sealing engagement of the forward annular edge 44d of the piston with the rear annular edge 28d of front bearing 28. The position of axial adjustment of needle valve portion 20a relative to seat 18h is adjusted by loosening set screw 72, turning knob 20 until the desired orifice size between valve seat 18h and needle valve conical seat 20h is determined, and thereafter retightening set screw 72 to press soft ball 70 against the threads of the threaded portion 20d of the adjustable valving member and preclude inadvertent axial movement of the valving member. Pins 60,62 are located, and the thread pitch is chosen, such that needle valve portion 20a is moved between a fully seated position against seat 18h in which communication through passage 18b is completely blocked and a desired, predetermined fully open position within a fraction or a revolution of knob portion 20. For example, the amount of rotary movement of knob portion 20 required to move from the fully seated position to the desired fully open position as determined by engagement of pins 60 and 62 may be three-quarters of a revolution.

When an impacting object such as a bracket 74 connected to a machine tool or transfer arm 76 strikes the front end 42b of piston rod 42, the piston rod assembly begins to move rearwardly within the bore 12e of the inner tubular housing. The initial rearward movement of the piston rod comprises a lost motion movement with respect to annular piston 44 until the shoulder 42d of the piston rod engages the front annular edge 44d of the piston to sealingly coact with the front annular edge of the piston and replace the sealing coaction previously provided by the engagement of the front annular edge of the piston and the rear annular edge 28d of the front bearing member so as to continue the preclusion of fluid communication between annular passage 52 and metering orifice 12c. Continued rearward movement of the piston rod carries the piston 44 rearwardly with the rod until the piston reaches its extreme compressed rearward working position seen in dotted lines in FIG. 2. The length of the collar portion 10d of outer tubular housing 10 is chosen relative to the stroke of the piston such that the bracket 70 encounters the front annular edge 10n of collar portion 10d just prior to the snap ring 50 bottoming against the front annular edge 18k of the inner tube retainer 18. Specifically, the length of collar portion 10d is chosen such that the distance from the front annular edge 10n of the collar portion to the front end 42b of the piston rod with the piston positioned in its extended rest position by spring 22 is generally equal to the predetermined axial distance from the extended rest position of the piston to the compressed rearward working position of the piston proximate the front annular edge 18k of adaptor 18 so that a machine tool or transfer arm impacting the front end of the piston rod will reach the front annular edge 10n of the collar portion just as the piston reaches its compressed working position proximate but spaced from the front annular edge 18k of the adaptor, whereby to avoid bottoming of the piston within the cylinder and further provide precise predetermined work positioning for a workpiece carried by the machine tool or transfer arm to facilitate the performance of a work operation on the workpiece.

As the piston assembly moves rearwardly within the bore 12e of the inner tube, fluid is ejected rearwardly from pressure chamber 24 through passage 18b and through the metering orifice defined between needle valve conical surface 20h and valve seat 18h whereafter the fluid passes into passage 18g and then radially outwardly through port 18i into the accumulator chamber 26 with the amount of resistance to such flow being determined by the setting of the needle valve relative to the valve seat 18h so as to provide a relatively soft or a relatively hard action for the shock absorber as desired or dictated for the particular application.

After the piston assembly has reached its extreme compressed rearward working position as determined by engagement of bracket 74 with the rear edge 10n of stop collar portion 10d of the outer tubular housing, return spring 22 takes over and urges the piston assembly forwardly toward its fully extended or rest position. The initial forward or retracting movement of the piston rod as urged by spring 22 comprises a lost motion movement with respect to piston 44 until the front annular shoulder 46b of piston retainer 46 engages the rear annular edge 44c of the piston. This rearward movement of the piston relative to the reduced diameter valving portion 42c of the piston rod opens up an annular passage between the front annular edge 44d of the piston and annular piston rod shoulder 42d so as to establish fluid communication between annular axial passage 52 and port 12c past annular piston rod shoulder 42d to thereby allow fluid to flow from the accumulator chamber 26 through port 12c and rearwardly through axial passage 52 and through apertures 46b and thereby allow the fluid to fill in behind the forwardly moving piston rod assembly as the piston rod assembly moves under the urging of spring 22 toward its extended position. As the piston rod assembly arrives at its extended position, the front annular edge 44d of piston 44 engages the rear annular edge 28d of front bearing member 28 to determine the fully extended position of the piston rod assembly and to cut off communication between accumulator chamber 26 and pressure chamber 24 by virtue of the sealing engagement of the front annular edge 44d of the piston and the rear annular edge 28d of bearing member 28. It will be seen that piston 44 coacts with port 12c to allow fluid flow through port 12c from the accumulator chamber 26 to the pressure chamber 24 during forward extending movement of the piston assembly but to at all times preclude fluid flow through port 12c from the pressure chamber to the accumulator chamber. The shock absorber is now ready for another impacting stroke from bracket 74 as element 76 continues to move through its work cycle.

The position of adjustment of the knob portion 20e at any given time, and thereby the amount of resistance being afforded by the shock absorber to the impacting object, is indicated by a graduated dial 70 wrapped around and secured to collar portion 10e at the rear of the outer tubular housing with the dial preferably containing numerical information correlating to the hardness or softness of the deceleration provided by the shock absorber in the given position of adjustment and with the numerical value of the given position of adjustment being indicated by coaction of a suitable indicia 80 on knob portion 20e with the number scale on the graduated dial 70.

The invention valving structure provides an extremely effective means of selectively adjusting the resistance provided by the shock absorber and yet is extremely simple in construction and is readily assembled without sophisticated assembly machinery or technology and without skilled labor. The invention valving structure thus allows the advantages of adjustability to be readily provided in extremely small shock absorbers. For example, the invention shock absorber may typically have an overall length of approximately three inches with an outside diameter of $\frac{3}{4}$ of an inch and an inside diameter of $\frac{1}{2}$ inch and may employ a piston rod of $\frac{1}{4}$ inch diameter.

The invention further provides a simple and effective stop collar mechanism for a shock absorber to ensure that the piston moves through its maximum working stroke but does not bottom against the end wall of the cylinder and to further provide precise predetermined work positioning for a workpiece carried by a machine tool or transfer arm impacting the piston rod.

FIGS. 11, 12 and 13 illustrate modified constructions for the outer tubular housing. Although in each case only a fragmentary portion of the shock absorber is shown in association with the outer tubular housing in the FIGS. 11, 12 and 13 modifications, it will be understood that the remainder of the shock absorber in each case is identical to the shock absorber illustrated and described in FIGS. 1–10.

With reference to the shock absorber of FIG. 11, the outer tubular housing 90 is of the so-called "primary" type and includes a front stop collar portion 90a; a front threaded portion 90b disposed rearwardly of stop collar portion 90a; a "primary" body portion 90c of generally smooth cylindrical configuration disposed rearwardly of threaded portion 90b and defining an annular shoulder 90d at the juncture of portions 90b and 90c; and a rear threaded portion 90e defining an annular shoulder 90f at the juncture of portions 90c and 90e. As with the outer tubular housing of the embodiment of FIGS.

1-10, the length of stop collar portion 90a is chosen such that the distance from the front annular edge 90g of the collar portion to the front end 42b of the piston rod with the piston positioned in its extended rest position by spring 22 is generally equal to the predetermined axial distance from the extended rest position of the piston approximate the front annular edge 18k of adaptor 18 so that an object impacting the front end of the piston rod will reach the front annular edge 90g of the collar portion 90a of the outer tubular housing just as the piston reaches its compressed working position proximate but spaced from the front annular edge 18k of the adaptor, whereby to avoid bottoming of the piston within the cylinder and further provide precise predetermined work positioning for the object impacting the piston rod.

Further, the shoulders 90d and 90f in cooperation with the threaded portions 90b and 90e allow the shock absorber to be seated against a mounting bracket 92 and 94, depending upon whether front or rear mounting is desired, with the result that the shock absorber may be replaced without losing the precise work positioning with respect to the object impacting the piston rod. Specifically, since the shoulder 90d or 90f is positively seated against the respective face of the front or rear mounting bracket, when the shock absorber is removed and replaced with a new shock absorber, the precise positioning of the shoulder 90d and 90f may be exactly duplicated with the result that the position of the front annular edge 90g of the collar portion of the outer shell is precisely duplicated as compared to the position occupied by the replaced shock absorber with the result that the precise predetermined work positioning of the object impacting the piston rod is preserved.

The outer tubular housing 96 of the embodiment of FIG. 12 is of the "rear flange" type and includes a front stop collar portion 96a; a main body cylindrical portion 96b and a rear flange portion 96c. As with the embodiments of FIGS. 1-10 and FIG. 11, the length of collar portion 96a is chosen such that the distance from the front annular edge 96d of the collar portion to the front end 42b of the piston rod with the piston positioned in its extended rest position by spring 22 is generally equal to the predetermined axial distance from the extended rest position of the piston to the compressed rearward working position of the piston proximate the front annular edge 18k of adaptor 18 so that an object impacting the front end of the piston rod will reach the front annular edge 96d of the collar portion 96a just as the piston reaches its compressed working position proximate the space from the front annular edge 18k of the adaptor, whereby to avoid bottoming of the piston within the cylinder and further provide precise predetermined work positioning for the object impacting the piston rod.

Further, the predetermined precise work positioning for the object impacting the piston rod may be retained when the shock absorber is replaced since the front annular face 96e of flange 96c is positively seated against the mounting bracket 98 with the result that the precise positive relationship of the face 96e of the rear flange relative to the bracket 98 may be precisely duplicated with the new shock absorber so that the precise positioning of the front annular edge 96d of the outer tubular housing is also preserved in the new shock absorber to preserve the precise predetermined work positioning for the object impacting the piston rod.

The outer tubular housing of the embodiment of FIG. 13 is of the "front flange" type and includes a front stop collar portion 100a; a mounting flange portion 100b rearwardly of stop portion 100a; and a main body portion 100c extending to the rear edge of the shock absorber. As with the embodiments of FIGS. 1-10, 11 and 12, the length of collar portion 100a is chosen such that the distance from the front annular edge 100d of the collar portion to the front end 42b of the piston rod with the piston positioned in its extended rest position by spring 22 is generally equal to the predetermined axial distance from the extended rest position of the piston to the compressed rearward working position of the piston proximate the front annular edge 18k of adaptor 18 so that an object impacting the front end of the piston rod will reach the front annular edge 100d of the collar portion just as the piston reaches its compressed working position proximate but spaced from the front annular edge 18k of the adaptor whereby to avoid bottoming of the piston within the cylinder and further provide precise predetermined work positioning for the object impacting the piston rod.

Further, since the front annular face 100e of flange 100b is positively positioned against mounting flange 102, the shock absorber may be replaced without losing the precise predetermined work positioning with respect to the object impacting the piston rod since the front annular face 100e on the front flange of the replacement shock may be positively positioned against the mounting bracket 102 to thereby precisely duplicate the position of the front annular edge 100d of the stop collar portion of the outer tubular housing relative to the impacting object.

Whereas preferred embodiments of the invention has been illustrated and described in detail, it will be apparent that various changes may be made in the disclosed embodiment without departing from the scope or spirit of the invention.

We claim:
1. A shock absorber comprising:
   an outer tubular housing having a front end and a rear end and defining a central axis;
   an inner tubular housing having a front end and a rear end, positioned within said outer tubular housing, and defining a pressure chamber within said inner housing and an annular accumulator chamber between said inner and outer housings;
   a piston assembly including a piston mounted for reciprocal sliding movement in said inner tubular housing and a piston rod connected to said piston and extending out of said front end of said tubular housings for impact by an object to be decelerated;
   port means establishing fluid communication between said pressure chamber and said accumulator chamber proximate the forward end of said pressure chamber;
   port means establishing fluid communication between said pressure chamber and said accumulator chamber proximate the forward end of said pressure chamber;
   means operative at all times, and irrespective of the fluid pressures in said pressure chamber and in said accumulator chamber, to preclude movement of fluid through said port means from said pressure chamber to said accumulator chamber; and
   valving means establishing fluid communication between said pressure chamber and said accumulator chamber proximate the rearward end of said pres- sure chamber and including means defining an axially extending passage proximate the rearward end of said pressure chamber and a valve member positioned in said passage to define an annular orifice with said passage means, adjustably movable along an axis parallel to said central axis, and operative in response to such movement to vary the size of said orifice and thereby vary the resistance to movement of fluid through said valving means.

2. A shock absorber according to claim 1 wherein said shock absorber further includes:
an adjuster member positioned exteriorally of said outer tubular member and operative when moved to adjustably move said valve member and thereby adjust the resistance provided by said valve means.

3. A shock absorber according to claim 2 wherein:
said axially extending passage extends rearwardly from the rear end of said pressure chamber coaxial with said axis;
said valve member comprises a needle valve coaxial with said axis and extending forwardly from the rear end of said outer tubular house; and
said adjuster member is connected to the rear end of said needle valve.

4. A shock absorber according to claim 3 wherein:
said shock absorber includes a rear end wall rigid with said outer tubular housing; and
said valve member and said adjuster member comprise a single integral member mounted for threaded movement in said rear end wall.

5. A shock absorber according to claim 4 wherein:
said adjuster member comprises a knob having an outer diameter approximating the outer diameter of said outer tubular housing.

6. A shock absorber according to claim 2 wherein:
said piston rod defines a valving portion proximate its rear end extending between front and rear annular shoulders;
said piston is annular, is positioned on said piston rod valving portion to define an annular axial passageway therebetween, and has an axial length less than the axial length of said valving portion so as to be slidable axially relative to said valving portion;
sliding movement of said piston on said piston rod valving portion between said shoulders is operative to effect selective communication between said annular axial passageway and said port means;
said axially extending passage extends rearwardly from the rear end of said pressure chamber coaxial with said axis;
said valve member comprises a needle valve coaxial with said axis and extending forwardly from the rear end of said outer tubular housing; and
said adjuster member is connected to the rear end of said needle valve.

7. A shock absorber according to claim 6 wherein:
said shock absorber includes a rear end wall rigid with said outer tubular housing; and
said valve member and said adjuster member comprise a single integral member mounted for threaded movement in said rear end wall.

8. A shock absorber according to claim 7 wherein:
said adjuster member comprises a knob having an outer diameter approximating the outer diameter of said outer tubular housing.

9. A shock absorber according to claim 1 wherein:
said piston rod defines a valving portion proximate its rear end extending between front and rear annular shoulders;
said piston is annular, positioned on said piston rod valving portion to define an annular axial passageway therebetween, and has an axial length less than the axial length of said valving portion so as to be slidably axially relative to said valving portion; and
sliding movement of said piston on said piston rod valving portion between said shoulders is operative to effect selective communication between said annular axial passageway and said port means.

10. A shock absorber comprising:
an outer tubular housing having a front end and a rear end and defining a central axis;
an inner tubular housing having a front end and a rear end, positioned within said outer tubular housing, and defining a pressure chamber within said tubular housing and an annular accumulator chamber between said inner and outer housing;
a rear end wall rigid with said outer tubular housing;
a piston assembly including a piston mounted for reciprocal sliding movement in said inner tubular housing and a piston rod connected to said piston and extending out of said front end of said tubular housing for impact by an object to be decelerated;
port means establishing fluid communication between said chambers proximate the front end of said pressure chamber;
means operative at all times, and irrespective of the fluid pressures in aid pressure chamber and in said accumulator chamber, to preclude movement of fluid through said port means from said pressure chamber to said accumulator chamber; and
valving means establishing fluid communication between said chambers proximate the rearward end of said pressure chamber and including means defining an axially extending passage extending rearwardly from the rear end of said pressure chamber coaxial with said axis, a needle valve extending through said rear end wall coaxial with said axis to dispose its forward end within said passage to coact with said passage to define a metering orifice, means mounting said needle valve for axial movement relative to said rear end wall so as to vary the size of said metering orifice, and an adjuster knob connected to the rear end of said needle valve and positioned rearwardly of said rear end wall to allow adjusting axial movement of said needle valve.

11. A chock absorber according to claim 10 wherein:
said means mounting said needle valve for adjustable movement comprise coacting thread means in said rear end wall and on said needle valve.

12. A shock absorber according to claim 11 wherein:
said piston rod defines a valving portion proximate its rear end extending between front and rear annular shoulders;
said piston is annular, is positioned on said piston rod valving portion to define an annular axial passageway therebetween, and has an axial length less than the axial length of said valving portion so as to be slidable axially relative to said valving portion; and
sliding movement of said piston on said piston rod valving portion between said shoulders is operative to effect selective communication between said annular axial passageway and said port means.

13. A shock absorber of the type including an outer tubular housing having front and rear ends and defining a central axis, an inner tubular housing having front and rear ends, positioned within said outer tubular housing, and defining a pressure chamber within said inner housing and an annular accumulator chamber between said housings, port means in said inner tubular housing establishing fluid communication between said pressure chamber and said accumulator chamber, a piston assembly including a piston mounted for reciprocal sliding movement in said inner tubular housing and a piston rod connected to said piston and extending out of the front ends of said housings for impact by an object to be decelerated, and valving means for selectively establishing fluid communication between the pressure chamber and the accumulator chamber, characterized in that the shock absorber includes means operative at all times, and irrespective of the fluid pressures in said pressure chamber and in said accumulator chamber, to preclude movement of fluid through said port means from said pressure chamber to said accumulator chamber and the valving means comprises means defining an axially extending passage extending rearwardly from the rear end of the pressure chamber, a needle valve extending forwardly from the rear end of the shock absorber coaxial with the central axis with its forward end positioned in said passage to define an annular orifice therebetween with the orifice varying in size depending upon the relative axial position of the tip of the needle valve within the passage, and means for selectively moving the needle valve axially to vary the size of the metering orifice and thereby vary the resistance provided by the valving means.

14. A shock absorber according to claim 13 wherein:
said means for moving said needle valve axially comprise coacting thread means in the rear end of said shock absorber and on said needle valve and a knob at the rear end of said needle valve to allow rotation of the needle valve to generate threaded movement of the needle valve along said axis.

15. A shock absorber of the type including an outer tubular housing having front and rear ends and defining a central axis, an inner tubular housing having front and rear ends, positioned within said outer tubular housing, and defining a pressure chamber within said inner housing and an annular accumulator chamber between said housings, port means in said inner tubular housing establishing fluid communication between said pressure chamber and said accumulator chamber, a piston assembly including a piston mounted for reciprocal sliding movement in said inner tubular housing and a piston rod connected to said piston and extending out of the front ends of said housings for impact by an object to be decelerated, and valving means for selectively establishing fluid communication between the pressure chamber and the accumulator chamber, characterized in that the shock absorber includes means precluding movement of fluid through said port means from said pressure chamber to said accumulator chamber; the valving means comprises means defining an axially extending passage extending rearwardly from the rear end of the pressure chamber, a needle valve extending forwardly from the rear end of the shock absorber coaxial with the central axis with its forward end positioned in said passage to define an annular orifice therebetween with the orifice varying in size depending upon the relative axial position of the tip of the needle valve within the passage, coacting thread means in the rear end of said shock absorber and on said needle valve, and a knob at the rear end of said needle valve to allow rotation of the needle valve to generate threaded movement of the needle valve along said axis; said piston rod defines a valving portion proximate its rear end extending between front and rear annular shoulders; said piston is annular, is positioned on said piston rod valving portion to define an annular axial passageway therebetween, and has an axial length less than the axial length of said valving portion so as to be slidable axially relative to said valving portion; and sliding movement of said piston on said piston rod valving portion between said shoulders is operative to effect selective communication between said annular axial passageway and said port means.

16. The shock absorber according to claim 15 wherein:
said front annular shoulder engages the front annular edge of said piston during decelerating rearward movement of said piston assembly to provide a seal therebetween and preclude communication between said annular axial passageway and said port means and said rear annular shoulder engages the rear annular edge of said piston during extending, forward movement of said piston assembly to allow fluid communication between said port means and said annular axial passageway to thereby allow fluid to flow from said accumulator chamber, through said port means, and through said annular axial passageway to filling the pressure chamber rearwardly of the forwardly moving piston.

17. A shock absorber of the type including an outer tubular housing having front and rear ends and defining a central axis, an inner tubular housing having front and rear ends, positioned within the outer tubular housing, and defining a pressure chamber within the inner housing and an annular accumulator chamber between the housings, a piston assembly including a piston mounted for reciprocal sliding movement in the inner tubular housing and a piston rod connected to the piston and extending out of the front ends of the tubular housings for impact by an object to be decelerated, first valving means establishing fluid communication between the chambers at a relatively forward location, and second valving means establishing fluid communication between the chambers at a relatively rearward location, characterized in that said first valving means is operative at all times, and irrespective of the fluid pressures in said pressure chamber and in said accumulator chamber, to preclude fluid flow from said pressure chamber to said accumulator chamber, and said second valving means includes means defining an axially extending passage proximate the rearward end of the pressure chamber, a valve member positioned in the passage to define a annular orifice with the passage means, adjustably movable along an axis parallel to the central axis, and operative in response to such movement to vary the size of the orifice and thereby vary the resistance to movement of fluid through the second valve means, and an adjuster member positioned exteriorly of the outer tubular housing and operative when moved to adjustably move the valve member and thereby adjust the resistance provided by the second valving means.

18. A shock absorber of the type including an outer tubular housing having front and rear ends, an inner tubular housing having front and rear ends, positioned within said outer tubular housing and defining a pressure chamber within said inner housing and an annular accumulator chamber between said housings, a piston assembly including a piston mounted for reciprocal sliding movement in said inner tubular housing, and a piston rod connected to said piston and extending out of the front end of said housing for impact by an object to be decelerated, characterized in that the piston rod defines a valving portion proximate its rear end extending between front and rear annular shoulders, the piston is annular, is positioned on the piston rod valving portion to define an annular axial passageway therebetween and has an axial length less than the axial length of said valving portion so as to be slidable axially relative to the valving portion, the inner tubular housing includes a port extending radially therethrough, and sliding movement of said piston on said piston rod valving portion between said shoulders is operative to effect selective communication between said annular axial passageway and said port.

* * * * *

UNITED STATES PATENT AND TRADEMARK OFFICE
CERTIFICATE OF CORRECTION

PATENT NO. : 5,159,997

DATED : November 3, 1992

INVENTOR(S) : Robert J. Heideman et. al.

It is certified that error appears in the above-identified patent and that said Letters Patent is hereby corrected as shown below:

Column 9, Line 7, Insert --to the compressed rearward working position of the piston--

Column 9, Line 29, Delete "and" Insert --or--

Column 12, Line 32, Delete "aid" Insert --said--

Column 12, Line 52, Delete "chock" Insert --shock--

Column 14, Line 30, Delete "filling" Insert --fill in--

Signed and Sealed this

Twenty-eighth Day of September, 1993

*Attest:*

BRUCE LEHMAN

*Attesting Officer*    Commissioner of Patents and Trademarks